United States Patent
Mickael

(10) Patent No.: US 11,204,430 B2
(45) Date of Patent: Dec. 21, 2021

(54) METHODS FOR GAIN STABILIZATION OF GAMMA RAY MEASUREMENTS

(71) Applicant: Scientific Drilling International, Inc., Houston, TX (US)

(72) Inventor: Medhat Mickael, Sugar Land, TX (US)

(73) Assignee: SCIENTIFIC DRILLING INTERNATIONAL, INC., Houston, TX (US)

( * ) Notice: Subject to any disclaimer, the term of this patent is extended or adjusted under 35 U.S.C. 154(b) by 0 days.

(21) Appl. No.: 17/081,385

(22) Filed: Oct. 27, 2020

(65) Prior Publication Data

US 2021/0124062 A1 Apr. 29, 2021

Related U.S. Application Data

(60) Provisional application No. 62/926,849, filed on Oct. 28, 2019.

(51) Int. Cl.
| | |
|---|---|
| *G01V 5/00* | (2006.01) |
| *G01T 1/17* | (2006.01) |
| *G01V 5/12* | (2006.01) |
| *G01T 7/00* | (2006.01) |

(52) U.S. Cl.
CPC .............. *G01T 1/17* (2013.01); *G01T 7/00* (2013.01); *G01V 5/12* (2013.01)

(58) Field of Classification Search
CPC .... G01T 1/17; G01T 7/00; G01T 1/40; G01V 5/12; G01V 5/06
See application file for complete search history.

(56) References Cited

U.S. PATENT DOCUMENTS

| | | | | |
|---|---|---|---|---|
| 3,794,843 | A | * | 2/1974 | Chen ...................... G01N 23/09 250/359.1 |
| 4,053,767 | A | | 10/1977 | Kampfer et al. |
| 4,300,043 | A | | 11/1981 | Robbins |
| 4,346,590 | A | | 8/1982 | Brown |
| 5,406,078 | A | | 4/1995 | Jacobson |
| 5,449,897 | A | * | 9/1995 | Bertelsen .............. G01T 1/1642 250/207 |
| 5,475,727 | A | | 12/1995 | Buchanan et al. |

(Continued)

OTHER PUBLICATIONS

Lu, Jiang-Hong; "An Algorithm for Intrinsic Gain and Offset Stabilization of Pulse Height Spectra"; Massachusetts Institute of Technology; Jan. 1991; 118 pages; Cambridge, MA.

*Primary Examiner* — Kiho Kim
(74) *Attorney, Agent, or Firm* — Locklar PLLC

(57) ABSTRACT

A method for adjusting a gain of a gamma detector comprises detecting gamma radiation using the detector, recording the detected radiation as count rates in channels, wherein the last channel accumulates all counts above the maximum recorded energy; comparing the last channel count rate (LCCR) to a threshold X and, if LCCR>X, decreasing the gain by a preset amount Y. If LCCR≤X, establishing a first estimate of a needed voltage HV1 using tool temperature and a temperature lookup table, and establishing a second estimate of a needed voltage HV2 using a backscatter peak value and a backscatter lookup table; comparing |HV1−HV2| to a threshold Z; if |HV1−HV2|<Z, adjusting the gain of the gamma detector by HV2 or, if |HV1−HV2|≥Z, adjusting the gain of the gamma detector by HV1.

8 Claims, 4 Drawing Sheets

(56) References Cited

U.S. PATENT DOCUMENTS

| | | | |
|---|---|---|---|
| 5,508,524 A * | 4/1996 | Goldberg | G01T 1/1647 |
| | | | 250/363.07 |
| 5,539,202 A * | 7/1996 | Geagan | G01T 1/1647 |
| | | | 250/363.02 |
| 5,600,135 A | 2/1997 | Jacobson | |
| 5,646,408 A * | 7/1997 | Goldberg | G01T 1/17 |
| | | | 250/363.07 |
| 5,910,654 A * | 6/1999 | Becker | G01V 5/12 |
| | | | 250/269.3 |
| 7,005,646 B1 | 2/2006 | Jordanov et al. | |
| 7,157,681 B1 | 1/2007 | Tetzlaff | |
| 7,800,052 B2 | 9/2010 | Gadot | |
| 8,173,953 B2 | 5/2012 | Stoller et al. | |
| 8,907,270 B2 | 12/2014 | Beekman et al. | |
| 9,500,753 B2 | 11/2016 | Moake | |
| 9,702,990 B2 | 7/2017 | Mickael | |
| 2005/0127282 A1 | 6/2005 | Grau et al. | |
| 2008/0083870 A1* | 4/2008 | Malmin | G01T 1/40 |
| | | | 250/252.1 |
| 2014/0084149 A1* | 3/2014 | Stoller | G01T 1/362 |
| | | | 250/261 |

\* cited by examiner

METHODS FOR GAIN STABILIZATION OF GAMMA RAY MEASUREMENTS

CROSS-REFERENCE TO RELATED APPLICATIONS

This application is a non-provisional application which claims priority from U.S. provisional application No. 62/926,849, filed Oct. 28, 2019, which is incorporated by reference herein in its entirety.

TECHNICAL FIELD/FIELD OF THE DISCLOSURE

The present disclosure is directed to a method for stabilizing the gain of a gamma ray measurement device.

BACKGROUND OF THE DISCLOSURE

In the context of hydrocarbon production, the measurement of naturally occurring gamma radiation as a function of depth in a borehole is one method for obtaining information about the formation surrounding the borehole, including information as to the presence, type and volume of shale or clay in the formations surrounding the borehole. Natural gamma ray logging systems typically include at least one gamma ray detector housed in a downhole tool that is conveyed along the borehole. As most shales are relatively rich in naturally occurring radioactive elements, natural gamma ray logs may be used to delineate shale from other formations or to assess the shale content of a formation. Another type of gamma ray logging system entails measurement of a spectrum of gamma radiation emitted by the earth formation. The spectrum measures the intensity of radiation as a function of radiation energy. This type of logging system is commonly referred to as a spectral gamma ray logging system.

In some cases, it may be advantageous to use a logging tool that includes a gamma source. The gamma source emits gamma radiation that passes through the wellbore wall and interacts with the formation adjacent to the tool, which results in induced gamma radiation. A portion of the induced gamma radiation is scattered back into the wellbore and can be detected by detectors in the tool. The gamma source may be selected such that the primary mode of interaction of the emitted radiation with the formation is Compton scattering. Thus, the gamma radiation detected by the detectors can be indicative of the bulk density of the formation and fluid-filled porosity.

It has been found that exposure to elevated temperatures for extended periods may alter the response of a gamma detector. The gain of a gamma detector may be defined as the ratio of the amplitude of recorded gamma pulses to the energy of the incoming gamma radiation. Changes in the response of the detector may be referred to as a change in gain. Unless the tool is adjusted to compensate for changes in gain, the measurements of gamma spectra determined at different wellbore depths will not be comparable and will not be useful for assessing the formation.

SUMMARY

A method for adjusting a gain of a gamma detector may comprise the steps of a) detecting gamma radiation using the gamma detector; b) recording the detected gamma radiation as count rates in channels, wherein the channels correspond to the energy of the detected gamma radiation and wherein the last channel accumulates all counts above the maximum recorded energy; c) comparing the count rate for the last channel to a threshold X; and d) if the count rate for the last channel is greater than the threshold X, decreasing the gain of the gamma detector by a decrease value Y. If the count rate for the last channel is not greater than the threshold X, a step e) may comprise 1) providing a temperature lookup table that correlates voltage values to temperatures and establishing a tool temperature and establishing a first estimate of a required high voltage HV1 using the tool temperature and the temperature lookup table; 2) providing a backscatter lookup table that correlates voltage values to backscatter peak values, measuring backscatter, using the measured backscatter to determine a backscatter peak value, and establishing a second estimate of a required high voltage HV2 using the backscatter peak value and the backscatter lookup table; and 3) comparing the absolute value of the difference between HV1 and HV2 to a threshold Z; i) if the absolute value of the difference between HV1 and HV2 is less than Z, adjusting the gain of the gamma detector by HV2; ii) if the absolute value of the difference between HV1 and HV2 is not less than Z, adjusting the gain of the gamma detector by HV1. After an optional reassessment period, steps a)-e) may optionally be repeated.

In the calculations performed in steps c)-d), X may equal 1 count per second. The backscatter peak value may be determined from the measured backscatter by taking the second derivative of the measured backscatter with respect to channel, by calculating a slope of the backscatter peak on the higher-energy side of the measured backscatter spectrum, or by determining which channel of the measured backscatter spectrum contains the highest count. The temperature lookup table and the backscatter lookup table may each be provided in firmware.

Step d) may include the steps of d2) determining whether the count rate for the last channel is greater than a second threshold X' that is greater than X; d3) if the count rate for the last channel is not greater than the second threshold X', decreasing the gain of the gamma detector by Y; and d4) if the count rate for the last channel is greater than a second threshold X', decreasing the gain of the gamma detector by a preset decrease value Y' that is greater than Y.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
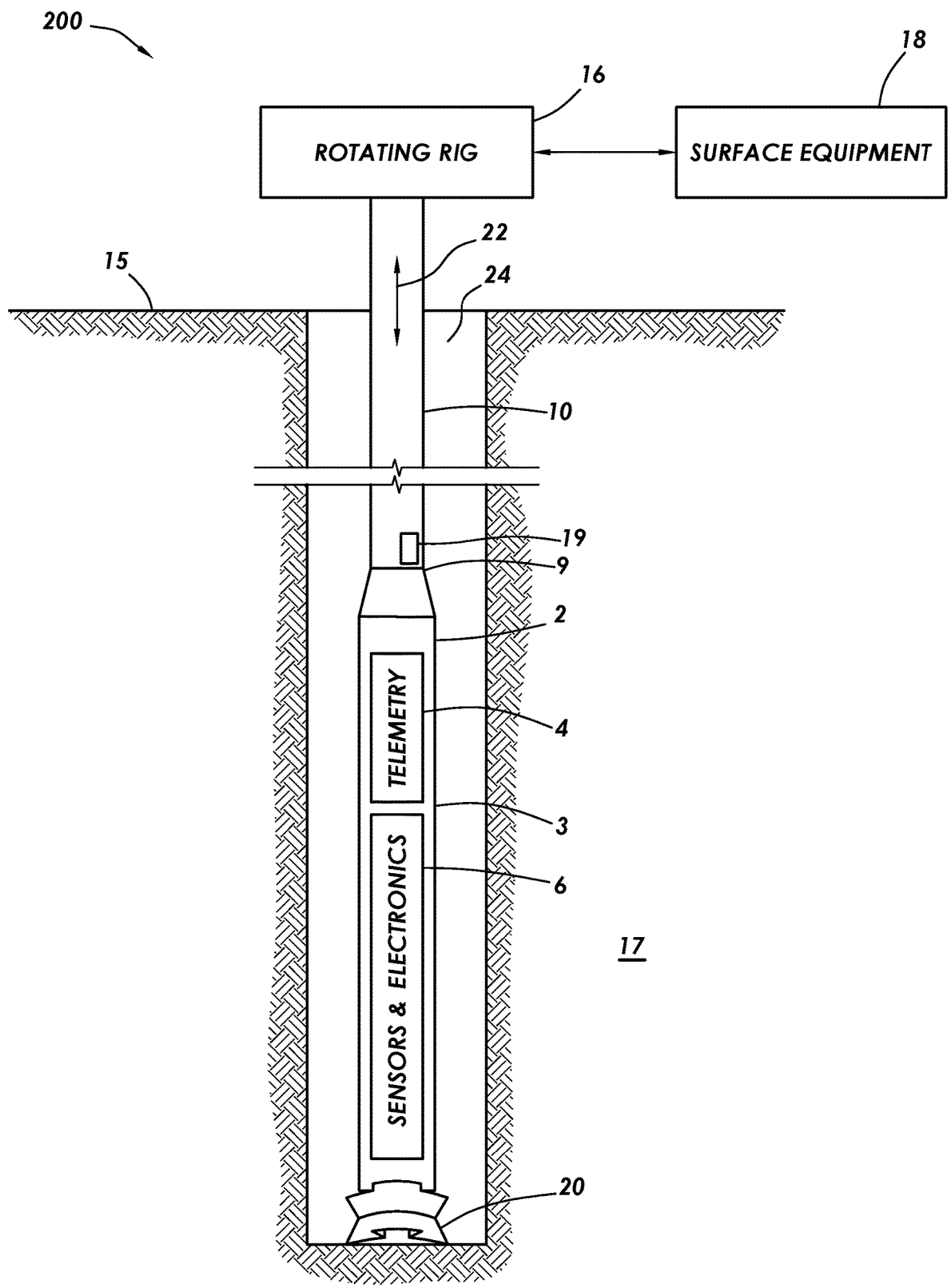
FIG. 1 is a schematic illustration of a drilling system including a logging tool consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring initially to FIG. 1, an exemplary drilling system 200 may include a logging tool 3 in a logging while drilling (LWD) configuration. Logging tool 3 may include a drill string 10 and a drill collar 2 and may be positioned in a borehole 24 that penetrates a subsurface formation 17. Drill string 10 terminates in a bit 20. Drill collar 2 may be mechanically coupled to the lower end of drill string 10. Bit 20 and logging tool 3 may be conveyed into borehole 24 by rotating drill string 10 by rotating rig 16 at the surface. Logging tool 3 may also include a sensor package 6 (including, for example, one or more microprocessors). Logging tool 3 may also include a telemetry section 4, which may include a transmitter or transceiver, such as a mud pulse generator, or an acoustic or electromagnetic transmitter to transmit measurement data from the sensors to the surface 15, as illustrated by telemetry arrow 22. When telemetry section 4 includes a transceiver, data and instructions may be communicated to logging tool 3 from surface equipment 18. Surface equipment 18 may include a receiver, a transceiver, and equipment for storage of measurement data and providing instructions to logging tool 3, much as a micro-processor and computer-readable, non-transitory media. Wired pipe or a wireline may also be used to communicate from a logging tool to surface equipment 18 and vice versa. In some embodiments, sensor package electronics 6 may communicate with a MWD system 9, which may include a MWD system controller 19.

Sensor package 6 may include a gamma detector configured to measure gamma radiation (either induced or naturally-occurring) emitted by the formation adjacent to the borehole. These measurements, in conjunction with the known depth of the detector at the time the measurements are recorded, may provide information about the types of formations through which the detector passes. For example, higher levels of gamma radiation at a particular depth may indicate a shale formation at that depth.

Gamma radiation detectors typically detect gamma radiation through the interaction of the gamma radiation with a scintillation crystal. Such interaction may occur through three primary mechanisms: photoelectric absorption, Compton scattering, and pair production. In each type of the interaction, incoming gamma radiation results in the emission of lower-energy photons having a total energy content that is generally proportional to the energy of the gamma radiation photon. The photons are reflected toward a photomultiplier, which converts their energy into an electrical pulse. The magnitude of each electrical pulse, which is proportional to the energy of its associated gamma radiation photon, can be measured and stored.

The stored pulse data can be used to create a gamma spectrum in which the energy spectrum is binned into ranges, or "channels," and each pulse increments the pulse count of the channel associated with its magnitude. The number of counts received per second is the count rate. Naturally occurring gamma ray spectra tend to have relatively low count rates as compared to induced gamma ray spectra.

Figure 2:
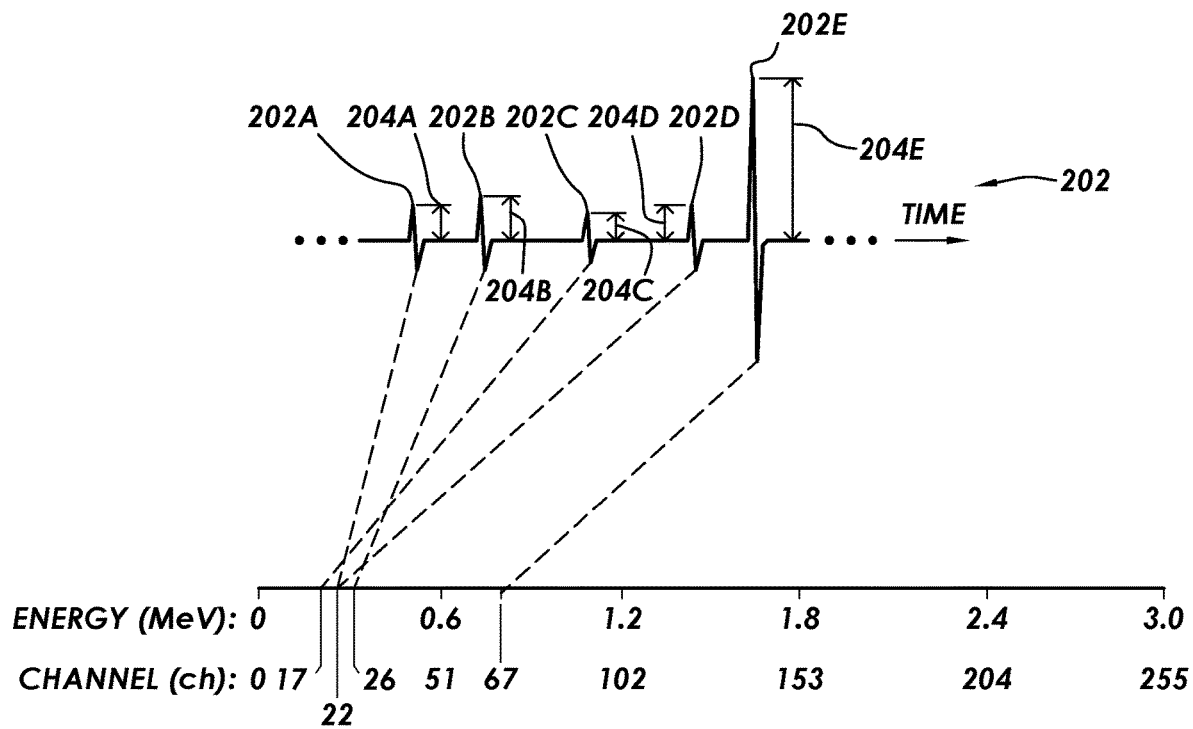
FIGS. 2 and 3 illustrate one known method for measuring and tracking incoming gamma radiation.
Figure 3:
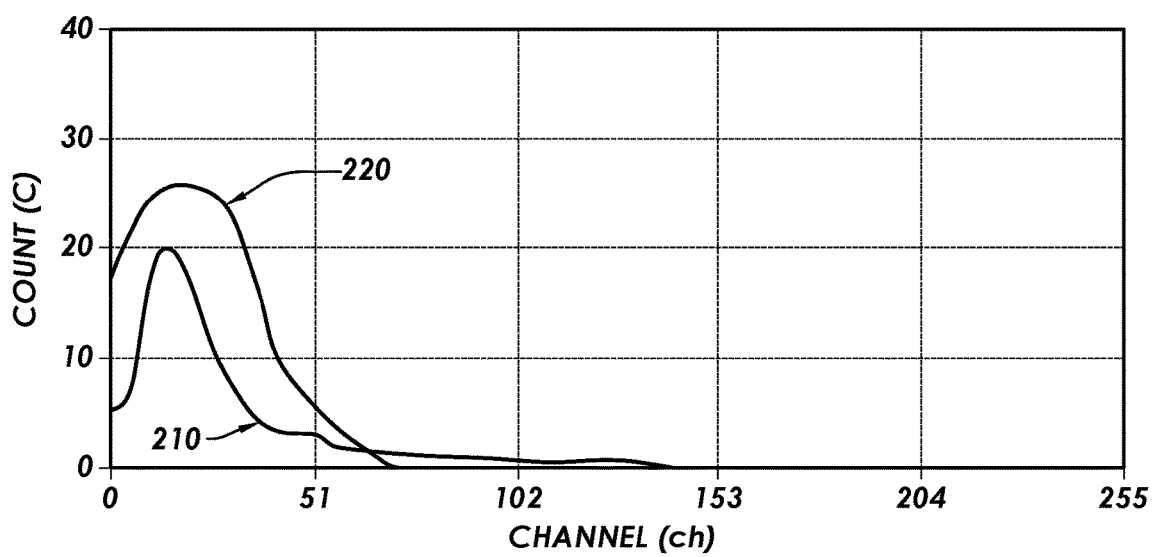

Referring briefly to FIG. 2, an illustration of a stream of pulses 202A, 202B, 202C, etc., generated in response to the detection of various gamma radiation photons. The amplitude 204A, 204B, 204C, etc., respectively, of each pulse 202 is proportional to the energy of its associated gamma radiation photon. The digitized pulse data may be provided to a controller, which may create a spectrum such as spectrum 210 or spectrum 220 as shown in FIG. 3. Spectrum 210 is an illustrative example of a naturally-occurring gamma radiation spectrum and spectrum 220 is an illustrative example of an induced gamma radiation spectrum. Essentially, each spectrum 210, 220 comprises a histogram in which each pulse increments a count of a particular bin or "channel" based on its amplitude. Thus, each spectrum is generally indicative of the energy of the incoming gamma radiation photons. Over time, the incoming radiation may populate the entire gamma spectrum shown in FIG. 3. In a variation, count values for each channel may be measured per time unit, such that the data for each channel is a count rate (e.g., counts per second).

Ideally, the shape of the resulting gamma spectrum should generally represent the summed effect of all radioactive isotopes present in the formation 17.

The resulting gamma spectra may be stored as a function of time and/or depth. The data may be stored in memory and retrieved later or may be transmitted to the surface as desired, provided suitable transmission means are available.

It has been found that exposure to elevated temperatures for prolonged operating times may decrease the sensitivity of the sensor package. In some such cases, the magnitude measured by the sensor package for the same gamma event (e.g., a Potassium-40 emission) will decrease over time. Such a change in pulse magnitude is referred to as a change in the gain of the detector. If the gain is referenced to a value of 1.0, a gain value between 0 and 1.0 indicates a decrease in gain and a gain value greater than 1.0 indicates an increase in gain. Unless the detector is adjusted to accommodate for changes in gain, measurements made at different times by the same tool will not be comparable and will be less useful for assessing the formation.

Figure 4:
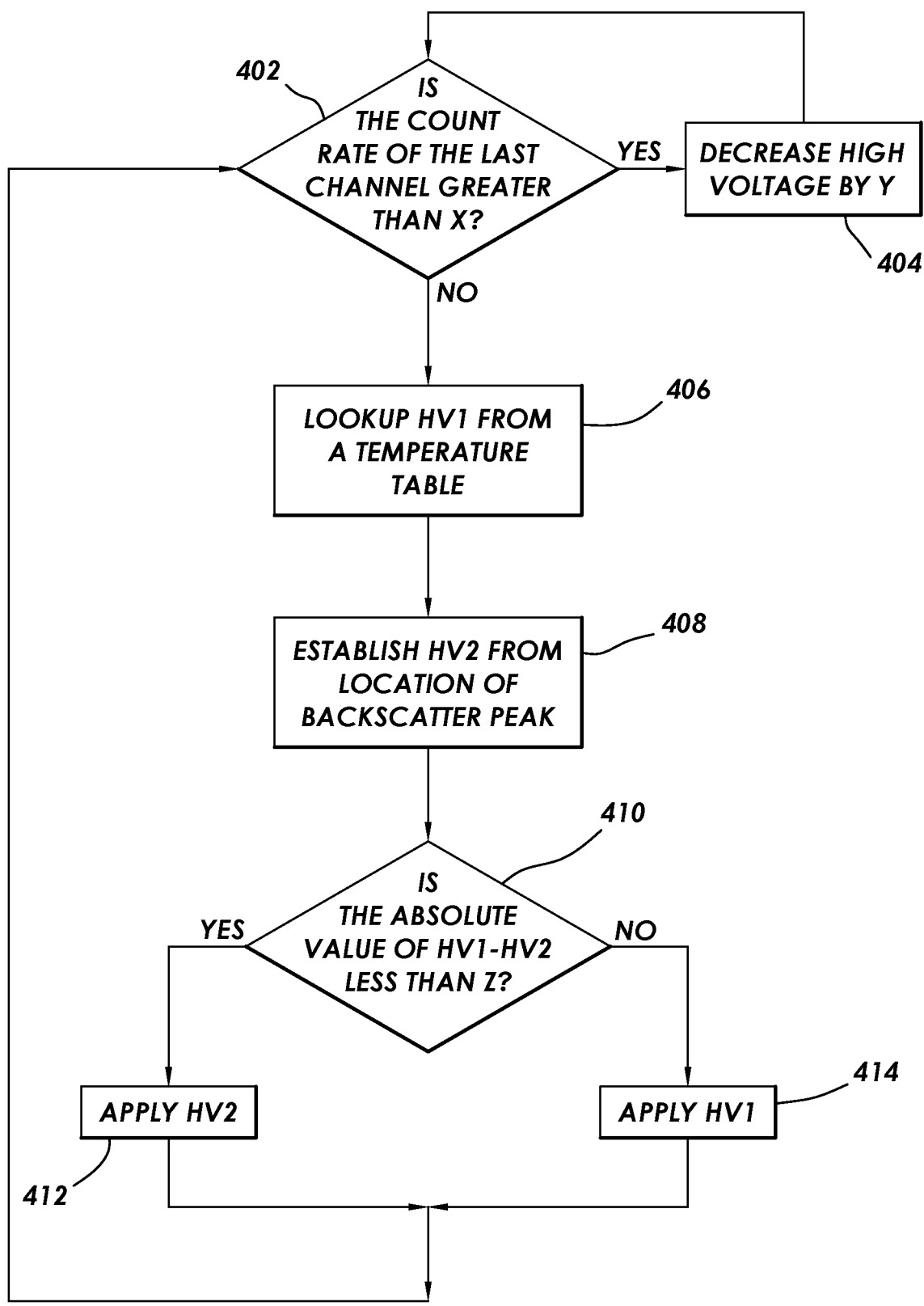
FIG. 4 is a flowchart illustrating one embodiment of a method for stabilizing the gain of a detector according to one embodiment of the present disclosure.

Referring now to FIG. 4, one method for compensating for changes in gain begins with comparing the count rate of the last channel to a predetermined threshold X (step 402). The count rate of the last channel accumulates all counts above the maximum recorded energy. If the gain adjustment is set correctly, the count rate of the last channel will typically be very small, e.g. less than 1 count per second (CPS). By contrast, if the gain adjustment is too high, the count rate of the last channel may be much higher than, for example, 1 CPS.

Thus, if the count rate of the last channel is greater than the preset threshold, the gain adjustment may be too high. In this case, the high voltage is decreased by a preset decrease value Y (step 404). In some embodiments, the preset decrease value may be determined by the count rate of the last channel. For example, if the count rate is above a second threshold X', a preset decrease value Y' that is greater than Y may be used. In some embodiments, no other measures are taken until the count rate is below the preset value.

If the count rate of the last channel is less than the threshold X, two additional values, HV1 and HV2, are obtained. In step 406, the temperature of sensor package 6 is measured and a first estimate of the required high voltage, HV1, is obtained from a temperature lookup table. A suitable temperature table may be constructed offline by mapping the required high voltage to maintain the correct gain versus temperature. The temperature lookup table may be provided in firmware that is provided with the gamma detector.

In step 408, a second estimate of the required high voltage, HV2, may be obtained from the location of the backscatter peak. A backscatter peak is always present in gamma ray spectra and is attributable to the balance of scattering and absorption of gamma rays in the medium. The backscatter peak results from gamma radiation having lost energy by interacting with elements present in the surrounding medium. The energy of the backscatter peak tends to be relatively low and relatively stable. The backscatter peak is also relatively independent of the density and elemental composition of the formation.

In some embodiments, the location (channel) of the backscatter peak may be determined by calculating the second derivative of the spectrum with respect to channel (energy) and determining which channel corresponds to or contains the minimum negative value of the second derivative and thus corresponds to or contains the peak. It may be advantageous to apply a smoothing algorithm to the spectrum before calculating the second derivative. A lower peak channel will tend to correspond to a lower high voltage. Using multiple spectra, a relationship, e.g. lookup table, may be established offline to correlate the required high voltage, HV2, as a function of the backscattering peak location.

In other embodiments, the required HV2 may be determined by calculating the slope of the spectrum to the right, or higher energy, side of the backscatter peak. Using the channel number of the backscatter peak, it is possible to calculate the slope of the portion of the spectrum that includes a few channels to the right of the peak. By way of example only, using spectra divided into the commonly-used 255 channels, the slope may be calculated using a start value between 0 and 5 channels to the right of the peak and an end value between 3 and 10 channels to the right of the peak. A larger slope value will tend to correspond to a lower peak value and a higher high voltage. Using multiple spectra, a relationship, e.g. lookup table, may be established offline to correlate the required high voltage, HV2, as a function of the slope of the higher energy side of the spectrum. In some instances, using the slope instead of the peak location may give better results. This is because the peak may be relatively low in energy and hence affected by electronics noise and because the peak location is more sensitive than the slope to the effective medium density and atomic number.

Figure 5:
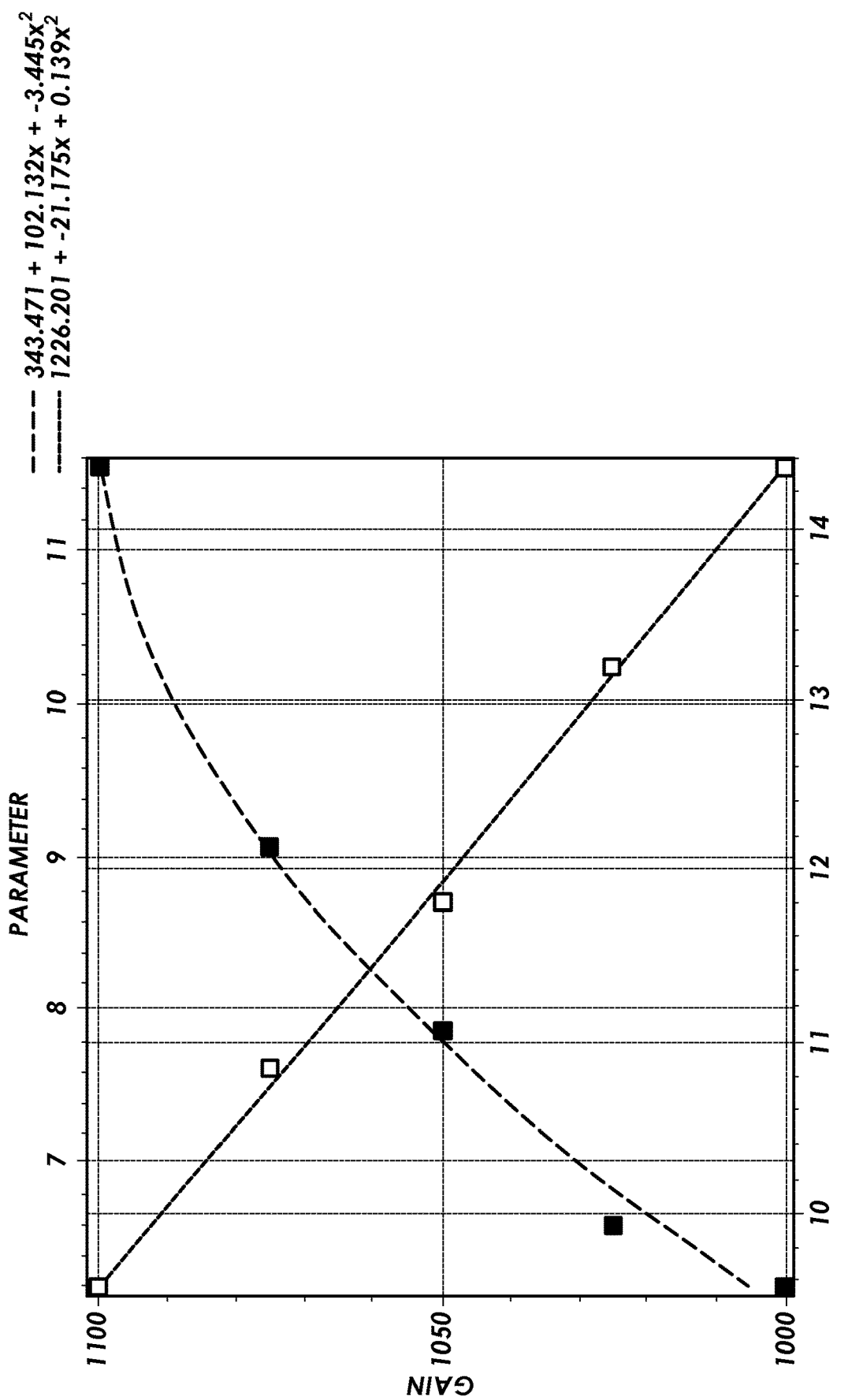
FIG. 5 is a plot of two correlations that may be used in some embodiments of methods disclosed herein.

FIG. 5 is a plot showing the two correlations described above. Specifically, line indicated by ■ represents the relationship between the backscatter peak location and high voltage and the line indicated by □ represents the relationship between the slope of the right side of the backscatter peak and high voltage.

In other embodiments, location of the backscatter peak may be calculated by other methods, including the methods described in US Application 2005/0127282. In still other embodiments, the gain calculation methods disclosed in Lu, Jiang-hong (1991), *An Algorithm for Intrinsic Gain and Offset Stabilization of Pulse Height Spectra*, Massachusetts Institute of Technology, Cambridge, Mass. may be used. Because measured gamma spectra can be influenced by many different factors, including but not limited to temperature, aging of the measurement device, the electromagnetic field in the device, mechanical shocks to the device, isotope concentrations, and the like, each method for calculating gain should be assessed for applicability to a given formation.

Thus, a relationship may be set offline to correlate the required high voltage as a function of the backscattering peak location. The resulting backscatter lookup table may be used in the downhole firmware to estimate the required high voltage from the backscatter peak location. The backscatter lookup table may be provided in firmware that is provided with the gamma detector. Steps 406 and 408 may be performed in any order or simultaneously.

In step 410, the absolute value of the difference between HV1 and HV2, ΔHV, is calculated. If ΔHV is less than a present difference threshold Z, then the gain is adjusted by HV2 (step 412). If ΔHV is not less than a present difference threshold Z, then the gain is adjusted by HV1 (step 414). This helps ensure that the location of the backscatter peak is correct and has not been affected by electronic or vibration-induced noise. Once the gain has been adjusted, and after a reassessment period, the steps may be repeated, beginning with step 402. The reassessment period may be from 0 seconds to several minutes or even hours long. In some embodiments, the reassessment period may be one minute, two minutes, three minutes, or more.

The methods disclosed herein avoid the need to provide energy stabilization sources (ECS) in the tool. In addition, the methods disclosed herein are insensitive to changes in count rate and are not affected by electronic or vibration-induced noise.

The present disclosure is equally advantageous when used with detectors measuring naturally-occurring gamma radiation and detectors measuring induced gamma radiation. Further, the methods disclosed herein can be used to improve measurements of any type of gamma radiation, including but not limited to borehole logging applications, medical applications, and the like. Likewise, the methods described herein are applicable to both logging-while-drilling and wireline logging systems.

Although systems and methods for assessing and adjusting the gain in a gamma detector, have been described in detail, it should be understood that various changes, substitutions and alterations may be made herein without departing from the scope of the disclosure as defined by the appended claims. Further, it will be understood that, unless explicitly so recited, a sequential recitation of steps in the claims that follow is not intended to be a requirement that the steps be performed sequentially.

What is claimed is:

1. A method for adjusting a gain of a gamma detector, comprising the steps of:
   a) detecting gamma radiation using the gamma detector;
   b) recording the detected gamma radiation as count rates in channels, wherein the channels correspond to the energy of the detected gamma radiation and wherein the last channel accumulates all counts above the maximum recorded energy;
   c) comparing the count rate for the last channel to a threshold X;
   d) if the count rate for the last channel is greater than the threshold X, decreasing the gain of the gamma detector by a preset decrease value Y;
   e) if the count rate for the last channel is not greater than the threshold X,
      1) providing a temperature lookup table that correlates voltage values to temperatures and establishing a tool temperature and establishing a first estimate of a required high voltage HV1 using the tool temperature and the temperature lookup table;
      2) providing a backscatter lookup table that correlates voltage values to backscatter peak values, measuring backscatter, using the measured backscatter to determine a backscatter peak value, and establishing a second estimate of a required high voltage HV2 using the backscatter peak value and the backscatter lookup table;
3) comparing the absolute value of the difference between HV1 and HV2 to a threshold Z;
   i) if the absolute value of the difference between HV1 and HV2 is less than Z, adjusting the gain of the gamma detector by HV2;
   ii) if the absolute value of the difference between HV1 and HV2 is not less than Z, adjusting the gain of the gamma detector by HV1; and
f) after an optional reassessment period, repeating steps a)-e).

2. The method according to claim 1 wherein X equals 1 count per second.

3. The method according to claim 1 wherein the backscatter peak value is determined from the measured backscatter by taking the second derivative of the measured backscatter with respect to channel.

4. The method according to claim 1 wherein the backscatter peak value is determined from the measured backscatter by calculating a slope of the backscatter peak on the higher-energy side of the measured backscatter spectrum.

5. The method according to claim 1 wherein the backscatter peak value is determined from the measured backscatter by determining which channel of the measured backscatter spectrum contains the highest count.

6. The method according to claim 1 wherein the temperature lookup table is provided in firmware.

7. The method according to claim 1 wherein the backscatter lookup table is provided in firmware.

8. The method according to claim 1 wherein step d) includes:
   d2) determining whether the count rate for the last channel is greater than a second threshold X' that is greater than X;
   d3) if the count rate for the last channel is not greater than the second threshold X', decreasing the gain of the gamma detector by Y; and
   d4) if the count rate for the last channel is greater than a second threshold X', decreasing the gain of the gamma detector by a preset decrease value Y' that is greater than Y.

* * * * *